United States Patent [19]

Bright et al.

[11] 4,219,323
[45] Aug. 26, 1980

[54] SELF-COMPENSATING HOT MANIFOLD LINK

[75] Inventors: Stephen A. Bright, West Milton; William R. Gaiser; John W. Gaiser, both of Dayton, all of Ohio

[73] Assignee: The Broadway Companies, Inc., Dayton, Ohio

[21] Appl. No.: 37,595

[22] Filed: May 9, 1979

[51] Int. Cl.² .............................................. B29F 1/022
[52] U.S. Cl. ...................................... 425/572; 249/110
[58] Field of Search ....................... 425/567, 572, 573; 249/105, 107, 110; 285/187, 61

[56] References Cited

U.S. PATENT DOCUMENTS

| | | | |
|---|---|---|---|
| 1,627,098 | 5/1927 | Koegle | 249/110 |
| 2,227,966 | 1/1941 | Emsley | 249/110 X |
| 2,239,338 | 4/1941 | Norelli | 425/572 |
| 2,445,484 | 7/1948 | Kopperman | 285/61 |
| 2,524,858 | 10/1950 | Thomas | 425/573 |
| 2,587,070 | 2/1952 | Spillman | 249/110 |
| 2,672,653 | 3/1954 | Simpkins et al. | 249/110 X |
| 2,871,517 | 2/1959 | Allard | 425/572 X |
| 3,044,120 | 7/1962 | Wiskoff et al. | 249/110 X |
| 3,093,805 | 6/1963 | Peters et al. | 425/567 X |
| 3,120,680 | 2/1964 | Villasana | 249/110 |
| 3,159,878 | 12/1964 | Scott et al. | 249/105 X |
| 3,520,026 | 7/1970 | Stidham et al. | 425/572 X |
| 3,893,720 | 7/1975 | Moebins | 285/187 |

Primary Examiner—J. Howard Flint, Jr.
Attorney, Agent, or Firm—Biebel, French & Nauman

[57] ABSTRACT

A link for coupling a plurality of injection mold manifolds has expansion and compression compensating slots for absorbing movement of the manifolds as they are heated and cooled.

8 Claims, 7 Drawing Figures

PRIOR ART

U.S. Patent  Aug. 26, 1980  Sheet 1 of 3  4,219,323
FIG-1  PRIOR ART
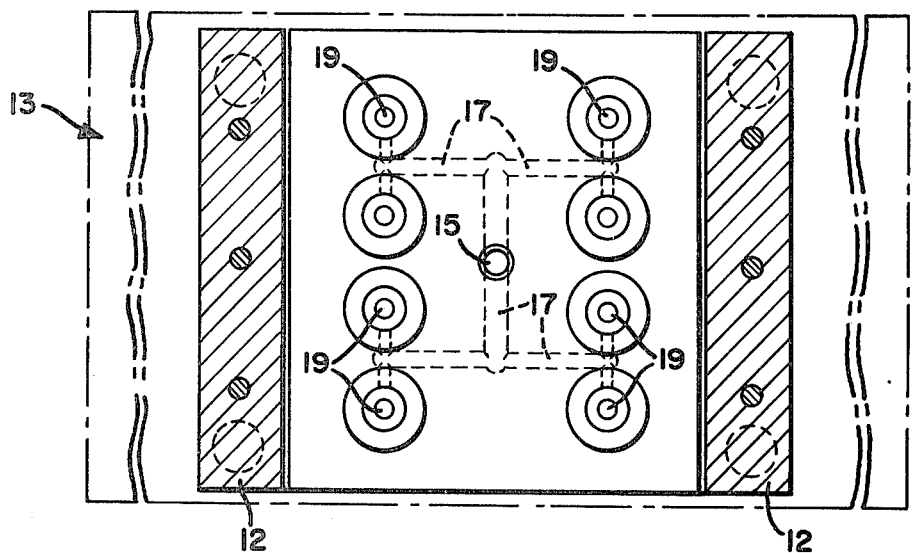
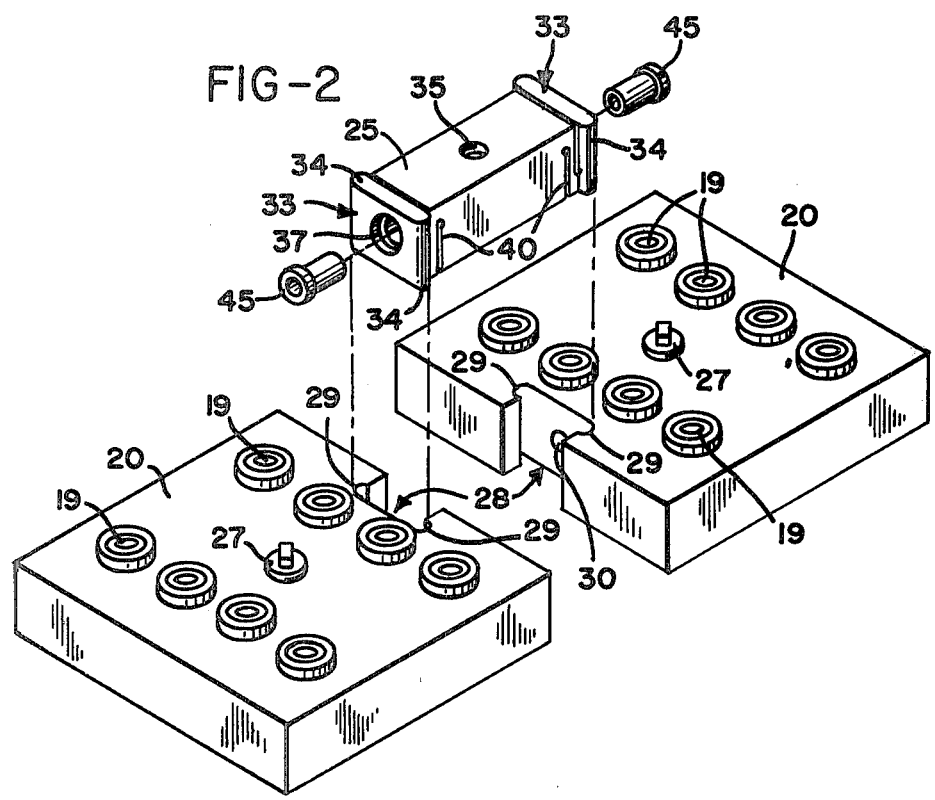

SELF-COMPENSATING HOT MANIFOLD LINK

BACKGROUND OF THE INVENTION

The present invention relates to the art of injection molding, and more particularly to a self-compensating link which provides for coupling and simultaneously injecting a plurality of molds from a single injection molding machine.

When designing a mold, a decision must be made concerning how many articles are to be formed in the mold. Ordinarily, a plurality of cavities is provided so that several of the articles, such as cups or bottles, will be simultaneously formed when the injection fluid, usually plastic, is injected. Typically, the plastic will be conducted to the mold cavities through a separate manifold which is coupled to receive the plastic from the injector and conduct it into the mold cavities. The molds and manifolds are rigidly mounted and secured since the injection pressures may be as high as 20,000 psi. To prevent unwanted freezing of the plastic in the sprues and runners, it is common practice to heat the manifold continuously with electric resistance heaters in channels or cavities therein.

From time to time, the demand for a particular molded article may increase substantially. Since in many cases the injection molding machines are capable of injecting substantially more material per cycle than is required for the particular molds in use, the purchase of an entire new injection molding machine should not be necessary. Instead, a larger capacity mold should suffice. However, newly designed and tested molds and manifolds are themselves quite expensive and the lead time for designing and testing may be unacceptable. Furthermore, to replace the manifolds and molds already in use with larger capacity manifolds and molds would not only entail the effective loss of the use, and hence the economic loss of the investment cost, of existing smaller capacity molds and manifolds, but would also risk additional production delays and expenses while the larger, newly designed units are production tested and "de-bugged". There are many reasons, therefore, not to depart from those designs and/or configurations which have been found through previous experience and development efforts to be effective and serivceable, and may in some instances have even become standardized.

There is thus a need to be able to quickly increase the production capacity of injection molding machines in response to changing customer demands, while avoiding the costs and delays mentioned above. Ideally, this would use existing, tried, and proven equipment in a manner compatible with the extreme and demanding conditions found in the injection molding environment.

SUMMARY OF THE INVENTION

Briefly, the present invention meets the above needs with a self-compensating hot manifold link which, in the preferred embodiment, links two manifolds for supplying injection fluid to them and to their respective molds from a common injection machine, thus doubling the production capacity of the injection machine for a given manifold and mold design configuration. The link of the present invention is readily suited for use with already existing manifolds with but nominal modifications thereto.

Assembly of such manifolds and molds, of course, takes place while they are cold. Also, due to the extremely high pressures during injection, the manifolds and molds are secured absolutely rigidly on a platen or frame so that they cannot move with respect to one another. Upon heating to operating temperatures, thermal expansion takes place, and it is an important feature of the present invention that the link is self-compensating for these thermal expansions. The link couples the rigidly mounted manifolds and absorbs nominal dimensional changes resulting from the expansion and contraction which takes place during heating and cooling.

To this end, the link body has an injector coupler for coupling to the injector for receiving fluid therefrom. This may be a conventional sprue which is threaded into a runner in the link body, and which couples to runners or channels within the body for conveying fluid from the injector through the body to manifold couplers located elsewhere on the link body. When two manifolds are to be coupled, the manifold couplers are on opposite ends of the link body, with the injector coupler in the center.

For simplicity of construction and assembly, the manifold and link couplers may simply be a tongue and groove configuration. For example, the link body may be equipped with tongue members at the manifold coupler, and the manifolds will have machined into them corresponding grooves. When the tongues are inserted into the grooves, the link and manifolds are rigidly secured to one another.

Expansion and contraction is accommodated by slots in the link body which are formed in planes which are substantially perpendicular to the direction of the anticipated expansions and contractions. The slots form an effective "corrugated" section on the link body, each section thus providing for movement of its manifold coupler (i.e., tongue portion) with respect to the remainder of the link body. As the manifolds are heated, therefore, and expand toward the link, the corrugations or slots are compressed and accommodate these changes in physical dimensions.

Preferably the link body is symmetrical, with compensating means (expansion and contraction slots) being provided for each manifold coupler, so that the injector coupler, which is located in the center of the link body, remains substantially stationary during the thermal expansions and contractions.

In the preferred embodiment, the slots are perpendicular to and intersect the fluid conveying channels inside the link body. To restore and maintain the integrity of the channels, a bushing is received in each channel where it is intersected by a slot. The bushings close and separate the channels from the slots and prevent leakage of injection material from the channels into the slots. Each bushing also extends to the end of its channel at the mold coupler and is formed of a material, such as beryllium-copper, which has a coefficient of thermal expansion greater than that of the material (usually steel) of which the link body itself is made. Upon heating, the bushings expand and seal firmly in their channels, and also expand, press, and seal firmly against the manifolds to which the link is coupled. This prevents leakage of the injection material at the slots and couplings.

It is therefore an object of the present invention to provide a self-compensating link for increasing the production capacity of an injection molding machine using existing manifold and/or mold configurations; a link which compensates for thermal expansions and contractions of rigidly secured manifolds and molds; which is readily adapted for use with such existing manifold and mold configurations with but nominal modifications thereto; which has injector coupling means and mold coupling means connected by channels within the link body, and expansion and contraction compensating means such as slots or corrugations substantially perpendicular to the direction of the expansions and contractions; which may also include bushings which expand faster than the link material for sealing the couplings; and to accomplish the above objects and purposes in an inexpensive, versatile and compatible configuration readily suited for use on a wide variety of injection manifold and mold configurations.

Other objects and advantages of the invention will be apparent from the following description, the accompanying drawings and the appended claims.

BRIEF DESCRIPTION OF THE DRAWINGS

FIG. 1 is a plan view of a prior art manifold;

FIG. 2 is an exploded perspective view of a link according to the present invention and two manifolds like that in FIG. 1 modified for coupling by the link;

DESCRIPTION OF THE PREFERRED EMBODIMENT

Figure 3:
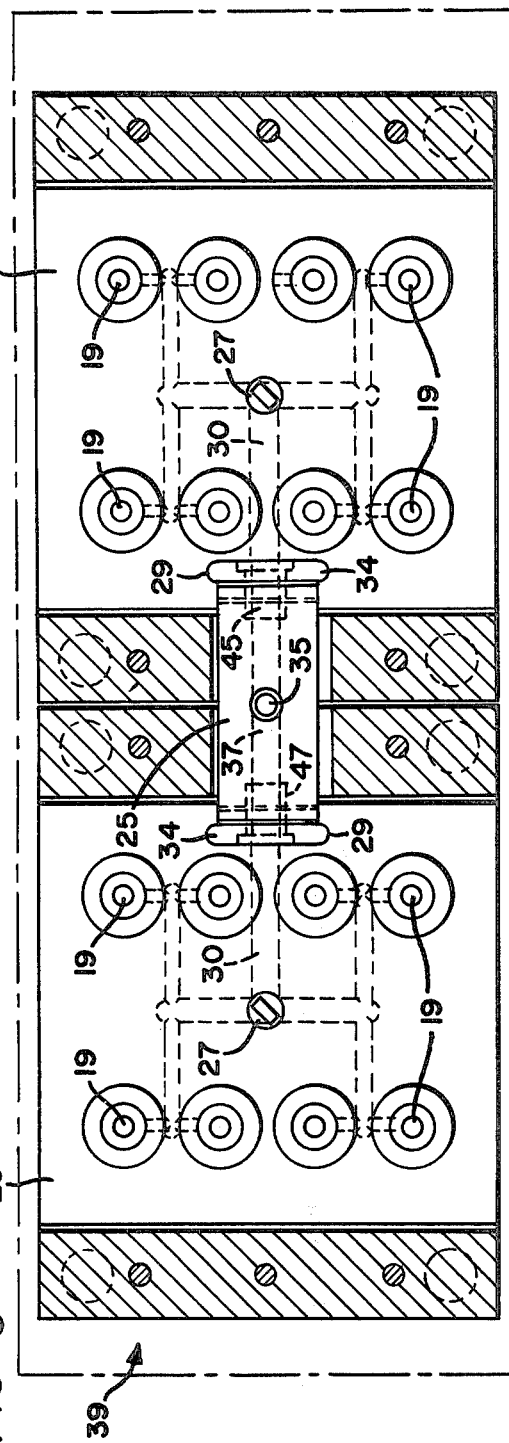
FIG. 3 is a plan view of the assembled and mounted components shown in FIG. 2.
Figure 5:
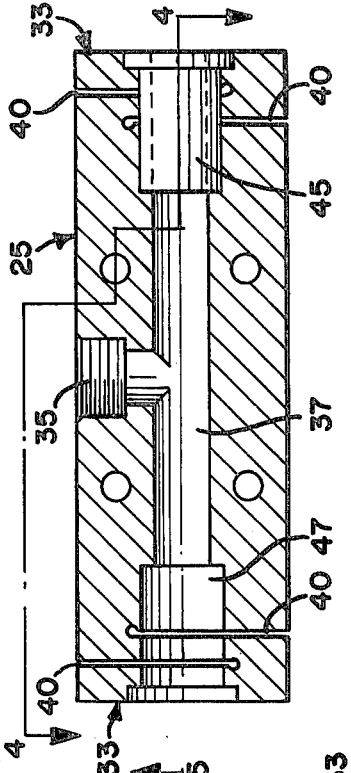
FIG. 5 is a cross-sectional view taken on line 5—5 of FIG. 4.
Figure 4:
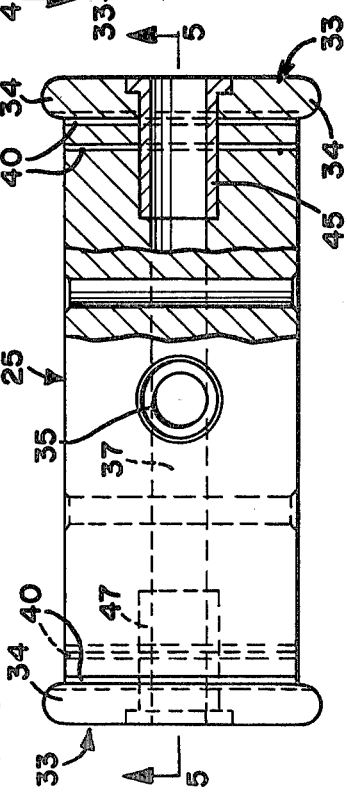
FIG. 4 is a partially sectioned plan view of the link taken on line 4—4 of FIG. 5.

FIG. 1 illustrates a prior art manifold 10 secured, as by blocks 12, to a suitable frame or platen 13. Manifold 10 is mounted above a mold (not shown) for distributing injection fluid, such as plastic, to the mold, and includes a conventional socket or coupling 15 for receiving plastic from an injection molding machine. Coupling 15 conducts the plastic into runners 17 which, in turn, distribute the plastic through the manifold to the individual mold cavities supported therebeneath. The manifold is kept hot, as by electric resistance heaters, and includes for example, openings 19 in the top for heaters which heat and keep the plastic hot as it is being injected into the mold therebeneath. Such configurations are well-known in the prior art.

FIG. 2 illustrates a pair of manifolds 20 which are basically the same as manifold 10 except that they have been modified to receive a self-compensating link 25 constructed in accordance with the present invention. More particularly, coupling 15 has been closed by a plug 27, and a new link coupling 28 having a pair of grooves 29 has been machined into one side of each of the manifolds 20. A new runner 30 (FIG. 3) connects from coupling 28 to the runner 17 directly beneath plug 27 to distribute plastic within manifold 20 as before.

Link 25 has manifold couplings 33 on each end thereof which have tongues 34 complementary to the grooves 29 in couplings 28. When couplings 33 are inserted into couplings 28, the link 25 and manifolds 20 are then rigidly locked together. Link 25 further includes an injector coupling 35 on the top thereof corresponding to the original coupling 15 in the prior art manifold 10, for receiving the injection fluid from the injection molding machine. Channels 37 within link 25 form runners connecting the injector coupling 35 to the manifold couplings 33, ending opposite the runners or channels 30 in the manifolds 20. When assembled on a suitable platen or frame 39 (FIG. 3), the manifolds 20 and link 25 are positioned to center coupling 35 beneath the injector, and channels 37 then carry the injection fluid into the manifolds 20 and thence to the molds therebeneath.

It will be appreciated that the FIG. 3 assembly is secured to frame 39 when in a relatively cold (i.e. room temperature) condition. Due to the extremely high injection pressures (up to 20,000 psi), the pair of manifolds 20 is secured to frame 39 just as rigidly as the single manifold 10 is secured for prior art injection. Upon heating the manifolds 20, therefore, tremendous stresses can be developed on the link as each manifold expands toward the other. To provide for this expansion while maintaining the integrity of the connection between the manifolds 20, link 25 includes expansion slots 40 extending almost entirely thereacross near each of the manifold couplings 33. The expansion slots 40 are substantially perpendicular to the direction of these manifold expansions and contractions, effectively providing corrugated ends in the link 25 to accommodate these movements.

As will be apparent from the drawings, the slots 40 are also perpendicular to the channels 37 at the couplings 33. In fact, in the preferred embodiment shown in FIGS. 1-5, the slots are so deep and so close to couplings 33 that they intersect the channels 37, creating the possibility that fluid might escape through the slots. To meet this condition, each of the link manifold couplings 33 has a tubular bushing 45 received in respective enlarged portions 47 of the channels 37 at each coupling 33. Preferably, the bushings 45 are sized for a snug fit in the enlarged channel portions 47, and are also made of a material which has a coefficient of thermal expansion greater than that of the link body at the coupling 33. For example, the links 25 are preferably made of steel, and the bushings 45 may be made of beryllium-copper which is an alloy having a coefficient of thermal expansion greater than that of steel. Then, when the link and manifolds are heated to operating temperature, the bushing expands and seats firmly within the enlarged channel portions 47, thereby preventing leakage of the injection material from the channel 37 into the expansion slots 40.

The bushings 45 also end immediately opposite the manifold runners or channels 30 (see FIG. 3) and, upon heating and expanding, will also seat firmly against the manifold link coupling 28 to seal thereagainst and prevent leakage of the injection material.

Figure 6:
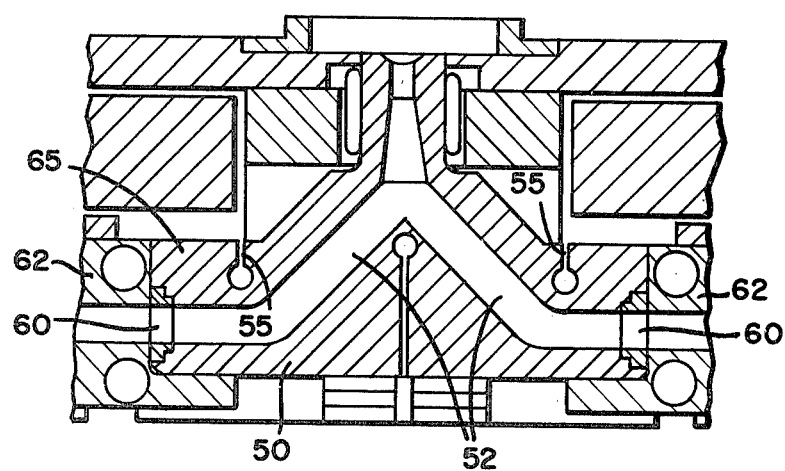
FIG. 6 is a cross-sectional view of another link configuration mounted and coupled to a pair of manifolds.
Figure 7:
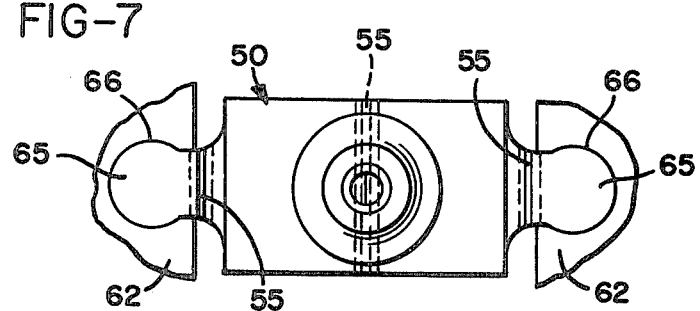
FIG. 7 is a plan view of the FIG. 6 link showing it coupled to a pair of manifolds.

FIGS. 6 and 7 illustrate a second embodiment of the invention, in which a link 50 has channels or runners 52 which form a V-shaped configuration to avoid intersecting more widely spaced slots 55 therein. As in link 25, however, the slots 55 extend into link 50 to such depths that any section on a plane in the direction of expansion and contraction will intersect at least one of the slots 55 (or slots 40 in link 25), so that no solid length of material binds one manifold to the other in a linear direction.

Link 50 also includes bushings 60 in the ends of the channels 52 for meeting and coupling against the manifolds 62 which are connected to the link 50. FIG. 7 shows an alternate form of couplings which are more cylindrical in shape than the couplings 28 and 33 of link 25 and manifolds 20. The respective couplings 65 and 66 on link 50 and manifolds 62, however, are still of an interlocking configuration (broadly characterizable as "tongue and groove") for the same reasons explained in connection with link 25 and manifolds 20.

As may be seen, therefore, the present invention has numerous advantages. It may be used to couple manifolds, or if the molds are directly injected, it can couple the molds themselves. (In the claims, therefore, the term "manifold" is to be broadly understood as meaning manifolds, molds or other injectable members as may be appropriate.) The present invention may also be used with existing manifold and mold designs, providing for virtually instantaneous increases in the production rate of injection molding machines with very little additional capital investment. When additional molds and manifolds are to be purchased, the present invention makes it possible to scale up production capacity using existing designs, so that the costs and delay of designing and testing larger capacity units can be avoided. The present invention not only quickly and easily couples the existing manifolds or molds together, it also essentially guarantees that the couplings will be properly sealed. Since the links are symmetrical in configuration, the injector couplings, such as coupling 35, remain stationary during the thermal expansions and contractions, for proper coupling to the injector. Also, while a two-manifold link is illustrated, the link could have three, four, or more arms for tripling or quadrupling the production rate of the injectors.

While the forms of apparatus herein described constitute preferred embodiments of this invention, it is to be understood that the invention is not limited thereto, and that changes may be made therein without departing from the scope of the invention.

What is claimed is:

1. For use in an injection molding machine, a self-compensating link for coupling a plurality of manifolds for injection from a common injector, comprising:
   (a) a link body,
   (b) injector coupling means on said link body for coupling to an injector to receive fluid therefrom,
   (c) manifold coupling means on said body for coupling to a plurality of manifolds to supply fluid thereto,
   (d) channel means in said body for conveying fluid therethrough from said injector coupling means to said manifold coupling means, and
   (e) expansion and contraction compensating means on said body for permitting and absorbing movement of said manifold coupling means on said body caused by thermal expansions and contractions of the manifolds while coupled thereto, to provide for coupling a plurality of such manifolds which, when in service, are mounted rigidly with respect to one another, heating them, and then injecting them simultaneously from a single injector.

2. The link of claim 1 wherein said manifold coupling means comprises interlocking tongue and groove means on the manifolds and said link.

3. The link of claim 1 wherein said compensating means further comprises expansion slot means in said link body oriented in planes substantially perpendicular to the direction of said expansions and contractions.

4. The link of claim 3 wherein said expansion slot means intersects said channel means, and further comprising bushing means received in said channel means were intersected by said slot means to close and separate said channel means from said slot means and prevent leakage of injection material from said channel means into said slot means.

5. The link of claim 4 wherein said bushing means consists of a material having a coefficient of thermal expansion greater than that of said link body where said channel and slot means intersect, for expanding upon heating to seal firmly to said channel means and prevent leakage of the injection material.

6. The link of claim 5 wherein said bushing means extends into said channel means from said manifold coupling means for expanding against manifolds coupled thereto upon heating to seal firmly thereagainst and prevent leakage of the injection material.

7. The link of claim 1 further comprising bushing means received and extending into said channel means from said manifold coupling means and consisting of a material having a coefficient of thermal expansion greater than that of said link body at said coupling means for expanding against manifolds coupled thereto upon heating to seal firmly thereagainst and prevent leakage of injection material.

8. For use in an injection molding machine, a self-compensating link for coupling a plurality of manifolds for injection from a common injector, comprising:
   (a) a link body,
   (b) injector coupling means on said link body for coupling to an injector to receive fluid therefrom,
   (c) manifold coupling means including tongue means on said body and groove means on the manifolds for coupling said link to a plurality of manifolds to supply fluid thereto,
   (d) channel means in said body for conveying fluid therethrough from said injector coupling means to said manifold coupling means,
   (e) expansion and contraction compensating slot means in said link body for permitting and absorbing movement of said manifold coupling means on said body caused by thermal expansions and contractions of the manifolds while coupled thereto, said expansion slot means intersecting said channel means and being oriented in planes substantially perpendicular to the direction of said expansions and contractions, and being disposed for keeping said injector coupling means substantially stationary during said thermal expansions and contractions, and
   (f) bushing means received and extending from said manifold coupling means into said channel means where intersected by said slot means to close and separate said channel means from said slot means and prevent leakage of injection material from said channel means into said slot means, said bushing means consisting of a material having a coefficient of thermal expansion greater than that of said link body where said channel and slot means intersect, for expanding upon heating to seal firmly to said channel means, to prevent leakage of the injection material, and to expand against manifolds coupled thereto upon heating to seal firmly thereagainst and prevent leakage of the injection material, said link providing for coupling a plurality of such manifolds which, when in service, are mounted rigidly with respect to one another, heating them, and then injecting them simultaneously from a single injector.

* * * * *